April 10, 1956 L. J. DARMSTADT ET AL 2,741,387
EXHAUST TIP PROTECTOR AND SHOCK ABSORBER
FOR VACUUM INSULATED VESSELS
Filed Nov. 20, 1952

INVENTORS
Louis J. Darmstadt
George W. Fuller
BY
Pennie, Edmonds, Morton, Barrows & Taylor
ATTORNEYS United States Patent Office 2,741,387
Patented Apr. 10, 1956

2,741,387
EXHAUST TIP PROTECTOR AND SHOCK ABSORBER FOR VACUUM INSULATED VESSELS

Louis J. Darmstadt and George W. Fuller, Norwich, Conn., assignors to The American Thermos Company, Norwich, Conn., a corporation of Ohio Application November 20, 1952, Serial No. 321,644

2 Claims. (Cl. 215—13)

This invention relates to means for mounting the filler of a vacuum insulated vessel within its case and more particularly to an improved shock absorber and tip protector for such filler.

In the normal fabrication of double-walled vacuum insulated glass vessels, commonly called fillers, there tends to be a variation in overall length which is adjusted by miscellaneous forms of springs, corks, supports formed of metal, rubber plastic, etc. A substantial proportion of these have a protective gasket of rubber or rubber compound or similar material to prevent scratching of the glass. Further, most of these means of supporting the filler in the case require a centering means to maintain the filler rigidly in the center of the case. This is often done by wrapping the filler with corrugated paper, placing springs along the side of the filler, and in certain cases using special forms of support to maintain the filler clear of the side walls, principally by frictional means.

In accordance with the present invention we provide the lower end of the filler with a tip protector in the form of a flanged cup, the flange extending outwardly from the rim of the cup and bearing against the bottom of the filler to which it is secured by a suitable adhesive, or other means such as shown in Patent No. 2,534,295. The filler is supported within its case by means of a shock absorber made of a spring metal band in the form of an inverted U standing on the bottom of the case and engaging its sides, and having a hole at the middle of its cross-member designed to receive the tip protector so that the shock absorber bears against the underface of the flange and does not make contact with the glass. The shock absorber adjusts itself to variations in filler length and resiliently supports the filler and tip protector above the bottom of the case. At the same time the filler is held in the center of the case and protected mechanically against lateral movement without any auxiliary device.

Figure 1:
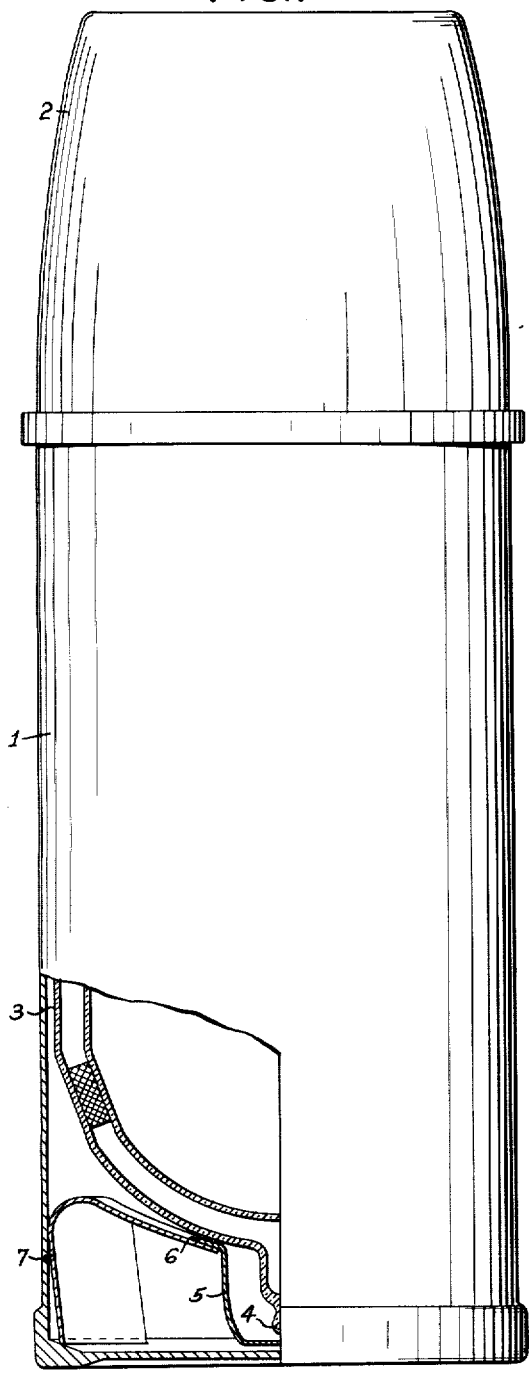
Figure 2:
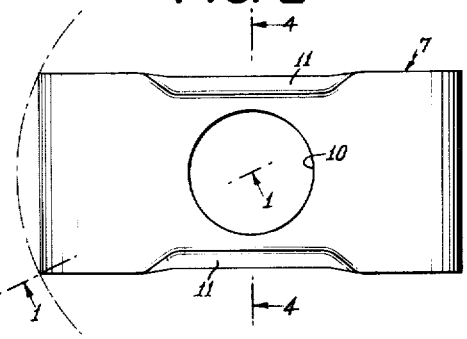
Figure 3:
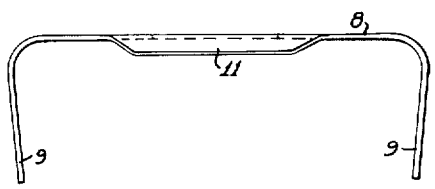
Figure 4:
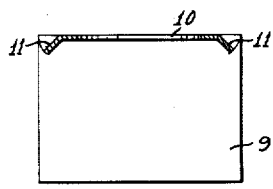

In the accompanying drawings, in which we have illustrated a preferred embodiment of our invention, Figure 1 is an elevation, partly in section, of a vacuum bottle, the filler of which is provided with the tip protector and shock absorber of our invention, Figure 2 is a plan view of the shock absorber, Figure 3 is a side elevation of the shock absorber, and Figure 4 is a transverse section of the shock absorber taken along line 4—4 of Fig. 2.

The vacuum bottle illustrated in Figure 1 comprises a case 1 on which is mounted the usual cup closure 2 and which contains a double-walled, vacuum-insulated glass filler 3 terminating at its lower end in the usual tip 4. In accordance with our invention this tip is enclosed within and protected by a tip protector 5 in the form of a cup, preferably of aluminum, the rim of which is provided with an outwardly extending flange 6 the upper face of which bears against the bottom of the filler 3 adjacent the tip and is secured to it by means of an adhesive capable of producing a strong permanent bond between the glass and the aluminum and rigidly maintaining the tip protector in the center of the filler. This bond may be further improved by etching the glass and aluminum by standard chemical or sand-blast methods. The adhesive should be waterproof and the bond shock resistant. Glues of the epoxy resin group are suitable but others may be used.

The filler, with its tip protector mounted on it as just described, is supported within the case 1 upon a shock absorber 7. This shock absorber is made of a strip of a resilient metal, such as spring steel, in the form of an inverted U consisting of a cross-member 8 and vertical arms 9. The center of the cross-member 8 is provided with a hole 10, the diameter of which is just large enough to receive the tip protector 5. The side edges of the cross-member 8, adjacent the hole 10, are bent downwardly to form flanges 11 which stiffen the cross-member.

In assembling the parts described, the shock absorber 7 is placed in the case, the four corners of the cross-member engaging the wall of the case to center the shock absorber with the arms 9 resting on the bottom. The filler with its tip protector is then inserted into the case, the tip protector extending through the hole 10 until its flanges 6 engage the cross-member 8 of the shock absorber. The cross-member will be deflected downwardly at the center as shown in Figure 1, the extent of this deflection being determined by the length of the filler, which may vary, the shock absorber adjusting itself to any variation in that length. The filler is thus resiliently supported and protected against shock. Although the shock absorber can be bent under the pressure of the filler, as illustrated, it cannot normally be bent so far as to permit the tip protector to engage the bottom of the case. The upper end of the filler is centered within the casing by conventional means, not shown, and which, of themselves, form no part of the present invention.

By means of our invention we are able to mount a filler within its case, center it accurately, provide for variations in length and protect it against shock, all without the use of the various adjusting means hitherto thought necessary. And by providing the tip protector with a flange secured to the bottom of the filler, we are able to dispense with the use of gaskets between the shock absorber and the filler.

We claim:

1. A vacuum insulated vessel comprising a case, a filler within the case, a flanged cup-shaped tip protector on the lower end of the filler, the upper face of the flange being fixedly secured to the filler about the tip of said filler, and a shock absorber of spring metal in the shape of a U resting open end downward on the bottom of the case and provided with a hole at the center of its cross-member for receiving and centering the tip protector with the major portion of the latter lying below said cross-member, the cross-member of the shock absorber engaging the lower face of the flange and the arms of the shock absorber lying along the inner wall of the case with their inner ends engaging said wall and their free ends engaging the bottom of the case.

2. A vacuum insulated vessel according to claim 1 in which the opposite edges of the cross-member are bent downwardly to form stiffening flanges.

References Cited in the file of this patent

UNITED STATES PATENTS

| 922,125 | Friedrich | May 18, 1909 |
| 1,855,039 | Wetmore | Apr. 19, 1932 |
| 2,163,057 | Payson et al. | June 20, 1939 |
| 2,534,295 | Payson et al. | Dec. 19, 1950 |
| 2,682,949 | Whitehead | July 6, 1954 |

FOREIGN PATENTS

| 593,739 | France | June 6, 1925 |
| 750,020 | France | May 15, 1933 |
| 604,031 | Great Britain | June 28, 1948 |

UNITED STATES PATENT OFFICE

CERTIFICATE OF CORRECTION

Patent No. 2,741,387                             April 10, 1956

Louis J. Darmstadt et al.

It is hereby certified that error appears in the above numbered patent requiring correction and that the said Letters Patent should read as corrected below.

In the grant, lines 2 and 3, and line 12, and in the heading to the printed specification, line 6, name of assignee, for "The American Thermos Company" read -- The American Thermos Bottle Company --.

Signed and sealed this 25th day of August 1959.

(SEAL)

Attest:

KARL H. AXLINE
Attesting Officer

ROBERT C. WATSON
Commissioner of Patents